US009705272B2

(12) United States Patent
Sakaguchi et al.

(10) Patent No.: US 9,705,272 B2
(45) Date of Patent: Jul. 11, 2017

(54) SLIP RING APPARATUS FOR ELECTRIC ROTATING MACHINE

(71) Applicant: MITSUBISHI ELECTRIC CORPORATION, Chiyoda-ku, Tokyo (JP)

(72) Inventors: Masayuki Sakaguchi, Chiyoda-ku (JP); Shintaro Shimizu, Chiyoda-ku (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 261 days.

(21) Appl. No.: 14/462,708

(22) Filed: Aug. 19, 2014

(65) Prior Publication Data

US 2015/0333605 A1 Nov. 19, 2015

(30) Foreign Application Priority Data

May 14, 2014 (JP) ................................ 2014-100078

(51) Int. Cl.
*H02K 13/02* (2006.01)
*H01R 39/08* (2006.01)
(Continued)

(52) U.S. Cl.
CPC ............... *H01R 39/08* (2013.01); *H02K 3/38* (2013.01); *H02K 13/02* (2013.01); *H01R 13/5845* (2013.01); *H01R 39/16* (2013.01)

(58) Field of Classification Search
CPC ........ H02K 13/02; H02K 13/003; H02K 3/38; H01R 39/08; H01R 39/16; H01R 39/14;
(Continued)

(56) References Cited

U.S. PATENT DOCUMENTS 2,471,808 A * 5/1949 Baker .................... H01R 39/08 310/232
3,059,330 A * 10/1962 Blair ......................... F16L 5/10 16/2.2
(Continued)

FOREIGN PATENT DOCUMENTS

EP 1337013 A2 8/2003
FR 2 928 043 A1 8/2009
(Continued)

OTHER PUBLICATIONS

Communication dated Oct. 7, 2015 from the French Patent Office in counterpart application No. 1460838.
(Continued)

*Primary Examiner* — Quyen Leung
*Assistant Examiner* — Eric Johnson
(74) *Attorney, Agent, or Firm* — Sughrue Mion, PLLC; Richard C. Turner

(57) ABSTRACT

A restricting member is provided that is in contact with respective bent lead portions of a long-sized lead and a short-sized lead and imparts a tension to linear lead portions thereof in a mold for insert molding. The restricting member reliably prevents the leads from displacement and deformation resulting from the pressure of the resin at the time of insert molding, and allows the long-sized lead and the short-sized lead to be disposed at proper positions in a molded body.

9 Claims, 4 Drawing Sheets

(51) Int. Cl.

| | |
|---|---|
| ***H02K 3/38*** | (2006.01) |
| *H01R 13/58* | (2006.01) |
| *H01R 39/16* | (2006.01) |

(58) Field of Classification Search

CPC ...... H01R 39/34; H01R 43/10; H01R 39/085; H01R 39/03

USPC ........................................................ 310/232

See application file for complete search history.

(56) References Cited

U.S. PATENT DOCUMENTS

| | | | | |
|---|---|---|---|---|
| 5,521,450 | A | 5/1996 | Rondier | |
| 6,007,387 | A | 12/1999 | Uchiyama | |
| 2003/0155835 | A1 | 8/2003 | Kondo et al. | |
| 2007/0257577 | A1* | 11/2007 | Bizjak | H01R 39/14 310/232 |

FOREIGN PATENT DOCUMENTS

| | | | |
|---|---|---|---|
| JP | 10193363 | A | 7/1998 |
| JP | 3622118 | B2 | 2/2005 |
| JP | 3812456 | B2 | 8/2006 |
| WO | 2013/118273 | A1 | 8/2013 |

OTHER PUBLICATIONS

Communication dated Mar. 24, 2015, issued by the Japanese Patent Office in counterpart Application No. 2014100078.

* cited by examiner

SLIP RING APPARATUS FOR ELECTRIC ROTATING MACHINE

BACKGROUND OF THE INVENTION

Field of the Invention

The present invention relates to a slip ring apparatus for an electric rotating machine such as an alternator for the vehicle.

Description of the Background Art

An electric rotating machine, such as an alternator for the vehicle, uses a slip ring apparatus in which a pair of slip rings each having a lead joined thereto are integrally formed by a molded body made of an insulating resin. Conventional slip ring apparatuses sometimes cause defects due to displacement or deformation of the leads, which result from the pressure of the resin during insert molding, and a structure which prevents these defects has been required.

For example, Patent Document 1 proposes, as a configuration for absorbing the deformation of the leads and allowing the lead to be disposed at a predetermined position, provision of a deformation absorbing portion in the lead within a connecting portion that connects a slip ring support cylindrical portion and a terminal retaining portion to each other. The deformation absorbing portion is such that the strength of the lead is lowered locally to absorb the deformation of the lead at the time of insert molding. This conventional Document mentions, as the examples of the deformation absorbing portion, a bend portion in which the lead is bent in a substantially V shape or in a substantially U shape, a cut-out portion in which the lead is cut out to be formed to have a smaller thickness, and a through-hole portion that intersects with a shaft.

In Patent Document 2, in order to avoid contact between a slip ring support cylindrical portion and a coil connection terminal, an insert is disposed at a linear portion between the slip ring support cylindrical portion and the coil connection terminal to ensure a sufficient gap. Patent Document 3 proposes a slip ring apparatus having through-holes for positioning the leads before insert molding in order to properly set the interval distance along the radial direction.

[Patent Document 1] Japanese Patent No. 3812456

[Patent Document 2] French Patent No. 2928043 B

[Patent Document 3] Japanese Patent No. 3622118

The technique of providing the deformation absorbing portion, which is proposed in Patent Document 1, has the following problems. In the case that the deformation absorbing portion is a bend portion, there is a possibility that the thickness of the bend portion that has been deformed does not fall within the range of the thickness of the connecting portion because the connecting portion, in which the lead is buried, does not have a sufficient radial thickness size. In the case that the deformation absorbing portion is a cut-out portion or a through-hole portion, the thickness of the lead does not increase, but it is possible that the lead may not fit into the insulating member because of deformation. In either case, there is a risk that the lead may be exposed outside the insulating member depending on the degree of deformation of the deformation absorbing portion.

In addition, in the case that the deformation absorbing portion is a cut-out portion or a through-hole portion, the strength of the lead is lowered locally at that portion. Consequently, there is a possibility that the lead cannot be able to withstand external forces and may result in breakage. In the slip ring apparatus, it is impossible to confirm in what shape the lead is accommodated in the molded body. Moreover, the slip ring apparatus is used for a long term in a vehicle. For these reasons, it is undesirable, from the viewpoint of reliability, to lower the strength of the lead by providing the deformation absorbing portion in the slip ring apparatus.

Although the technique proposed in Patent Document 2, in which the insert is disposed at the linear portion, appears to be able to determine the position of the lead at the time of secondary molding. However, strictly speaking, the technique can restrict the position of the lead only in radial directions. In the technique proposed in Patent Document 3, in which the positioning of the lead is carried out by a through-hole, the linear portion of the lead is not retained. For this reason, the bent portion of the lead may be displaced because of the pressure of the resin at the time of molding.

SUMMARY OF THE INVENTION

This invention has been accomplished in order to solve the problems as described above, and it is an object of the invention to obtain a slip ring apparatus for an electric rotating machine that can reliably prevent the leads from displacement or deformation at the time of insert molding.

A slip ring apparatus for an electric rotating machine according to the invention includes a first ring, a second ring, a long-sized lead, a short-sized lead, a restricting member, and a molded body. The first ring and the second ring are insulated from each other and disposed coaxially with each other. One end of the long-sized lead is connected to the first ring, and the other end thereof is connected to a rotor coil. One end of the short-sized lead is connected to the second ring, and the other end thereof is connected to the rotor coil. The restricting member determines positions of the long-sized lead and the short-sized lead. The molded body is formed by insert molding, and is configured to retain the first ring, the second ring, the long-sized lead, the short-sized lead, and the restricting member. The long-sized lead and the short-sized lead respectively have linear lead portions disposed axially parallel to each other, and bent lead portions formed by bending the linear lead portions radially outward. The restricting member has lead support portions each being in contact with at least a radially outward face of each of the bent lead portions of the long-sized lead and the short-sized lead. The restricting member is to be disposed in a mold for the insert molding in such a state that the bent lead portions are brought into contact with the lead support portions so as to impart a tension to the linear lead portions.

The slip ring apparatus for an electric rotating machine according to the invention is provided with the restricting member being in contact with the bent lead portions of the long-sized lead and the short-sized lead and imparting a tension to the linear lead portions in the mold for the insert molding. Therefore, the slip ring apparatus according to the invention can reliably prevent the long-sized lead and the short-sized lead from displacement and deformation resulting from the pressure of the resin at the time of insert molding, and allows the long-sized lead and the short-sized lead to be disposed at proper positions in the molded body.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
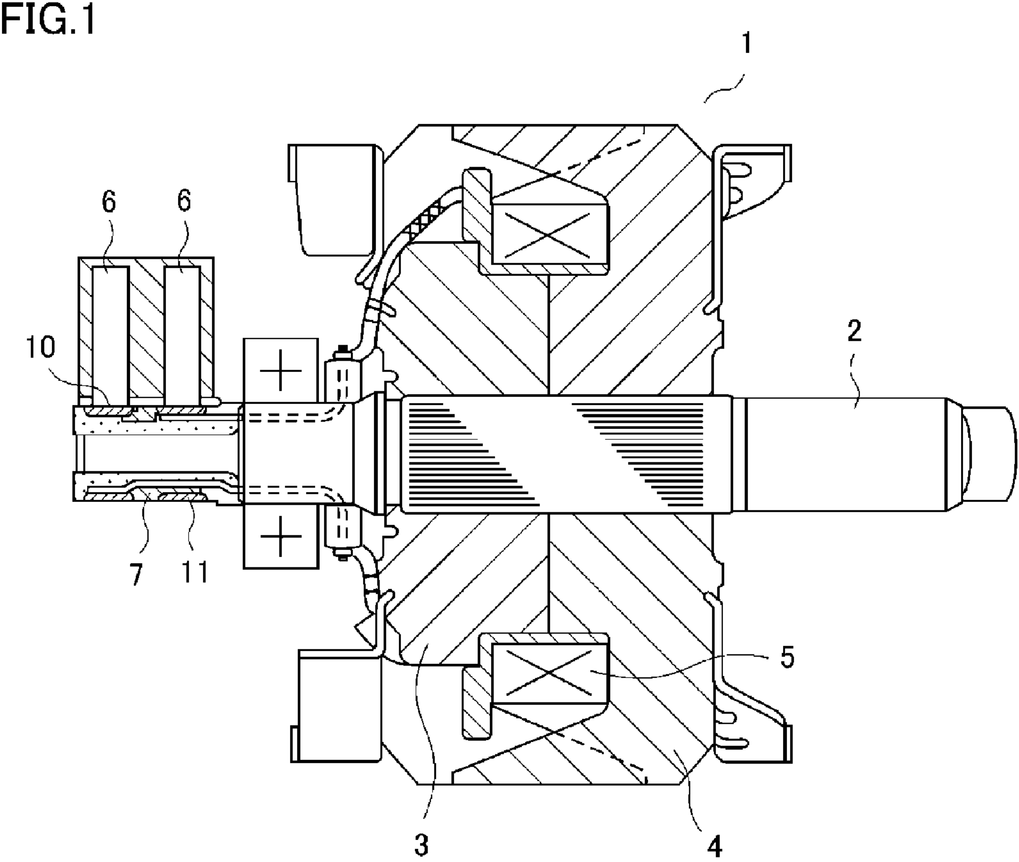
FIG. 1 is a cross-sectional view showing a rotor of an alternator for the vehicle according to a first embodiment of the invention.
Figure 2:
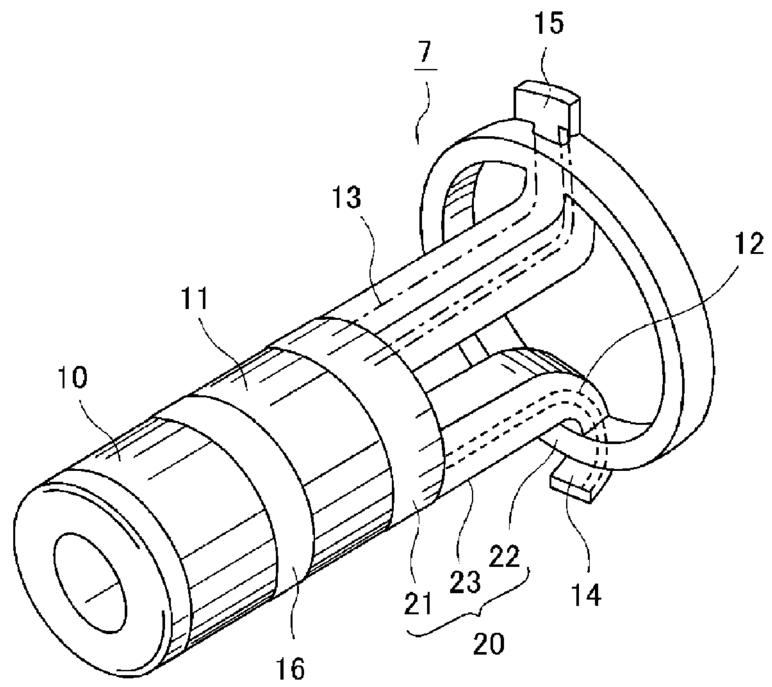
FIG. 2 is a perspective view showing a slip ring apparatus according to the first embodiment of the invention.
Figure 3:
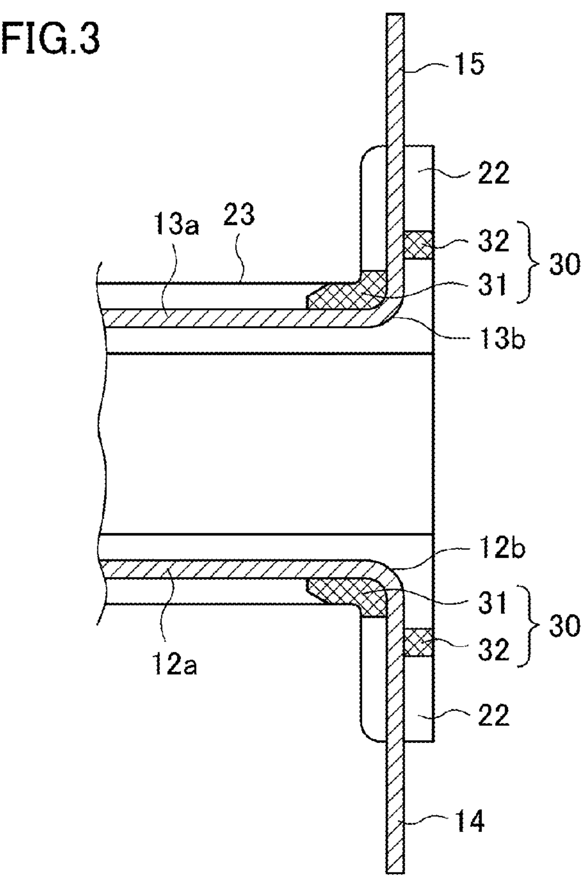
FIG. 3 is an enlarged cross-sectional view showing a primary portion of the slip ring apparatus according to the first embodiment of the invention.

Hereinbelow, a slip ring apparatus, according to a first embodiment of the invention, of an alternator for the vehicle will be described with reference to the drawings. FIG. 1 is a cross-sectional view along an axis line direction showing a rotor of an alternator for the vehicle provided with the slip ring apparatus according to the first embodiment of the invention. FIGS. 2 and 3 are a perspective view showing the slip ring apparatus according to the first embodiment of the invention, and an enlarged cross-sectional view showing a primary portion thereof, respectively. It should be noted that, in the drawings, the same or corresponding component parts are designated by the same reference signs.

A rotor 1 of an alternator for the vehicle (hereinafter referring to as "alternator") is provided inside a stator (not shown) fixed to an inner wall of a case (not shown) and is fixed to a shaft 2. The rotor 1 has a pair of claw magnetic poles 3 and 4 opposed to each other, and a rotor coil 5, in which a lead wire is coiled, provided inside the claw magnetic poles 3 and 4. The stator is such that a stator coil is wound around a stator core. A pulley (not shown) is fixed to one end of the shaft 2, and a slip ring apparatus 7 is inserted in and fixed to the other end thereof.

The operations of the alternator will be described briefly. Electric current is supplied from a battery (not shown) through a brush 6 and the slip ring apparatus 7 to the rotor coil 5 of the rotor 1. This electric current generates a magnetic flux in the rotor coil 5, producing the north pole and the south pole at the claw magnetic poles 3 and 4. On the other hand, the pulley is driven by an engine, causing the shaft 2 to rotate the rotor 1. As a consequence, a rotating magnetic field is imparted to the stator core, and an electromotive force is produced in the stator coil.

The slip ring apparatus 7 according to this first embodiment will be described with reference to FIGS. 2 and 3. The slip ring apparatus 7 has: a first ring 10 and a second ring 11, which are a pair of slip rings insulated from each other and disposed coaxially with each other; a long-sized lead 12 and a short-sized lead 13 and their respective terminal portions 14 and 15; a restricting member 30 for determining the positions of the long-sized lead 12 and the short-sized lead 13; and a molded body 20 formed of an insulating resin.

The first ring 10 and the second ring 11 are disposed with an insulative ring support portion 16 interposed therebetween. One end of the long-sized lead 12 is connected to the first ring 10 by welding, and the other end thereof, the terminal portion 14, is connected to the rotor coil 5 also by welding. One end of the short-sized lead 13 is connected to the second ring 11 by welding, and the other end thereof, the terminal portion 15, is connected to the rotor coil 5 also by welding.

In addition, the molded body 20, which is formed by insert molding, retains the first ring 10, the second ring 11, the long-sized lead 12, the short-sized lead 13, and the restricting member 30 from each other so that they are insulated from each other. As shown in FIG. 2, the molded body 20 has a cylindrical tubular portion 21, which is the main part of the molded body, a ring-shaped terminal supporting portion 22 for supporting the terminal portions 14 and 15, and a pair of connecting portions 23 for connecting the cylindrical tubular portion 21 and the terminal supporting portion 22 to each other. Except for their respective terminal portions 14 and 15, the long-sized lead 12 and the short-sized lead 13 are buried inside the cylindrical tubular portion 21, the pair of connecting portions 23, and the terminal supporting portion 22 of the molded body 20.

As shown in FIG. 3, the long-sized lead 12 and the short-sized lead 13 respectively have linear lead portions 12*a* and 13*a*, which are disposed axially parallel to each other, and bent lead portions 12*b* and 13*b*, which are formed by bending the respective linear lead portions 12*a* and 13*a* approximately 90 degrees radially outward. The restricting member 30 has lead support portions 31 each being in contact with at least a radially outward face of each of the bent lead portions 12*b* and 13*b*.

Figure 4:
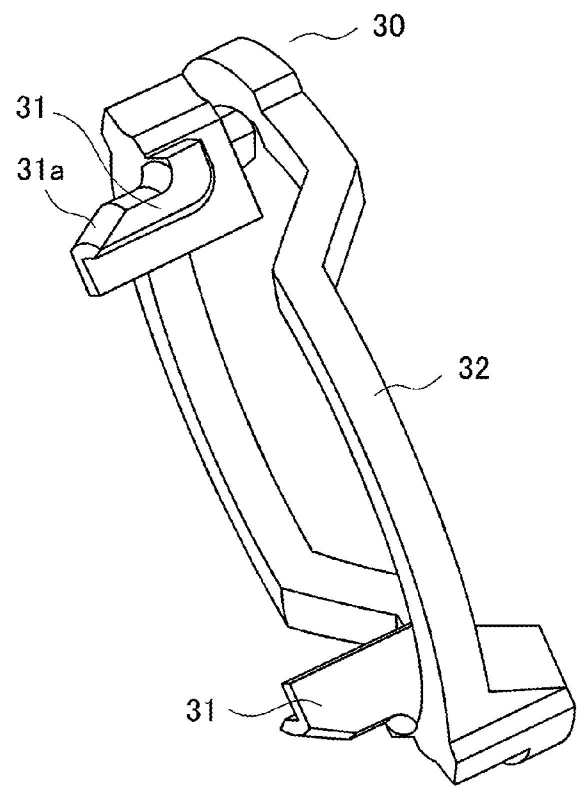
FIG. 4 is a perspective view showing a restricting member of the slip ring apparatus according to the first embodiment of the invention.
Figure 5:
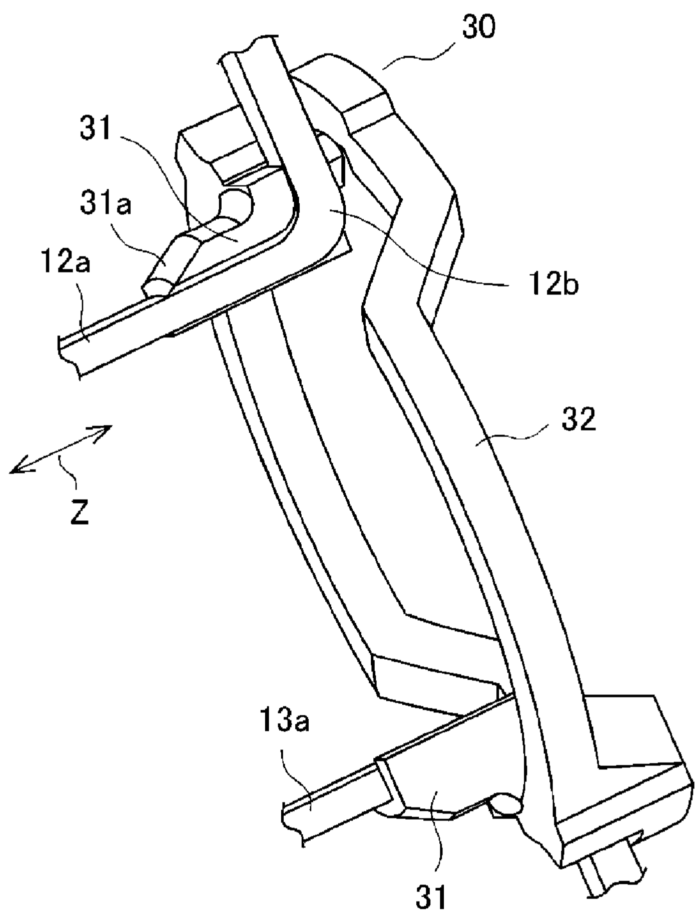
FIG. 5 is a perspective view showing a state in which a lead is fitted into the restricting member of the slip ring apparatus according to the first embodiment of the invention.
Figure 6:
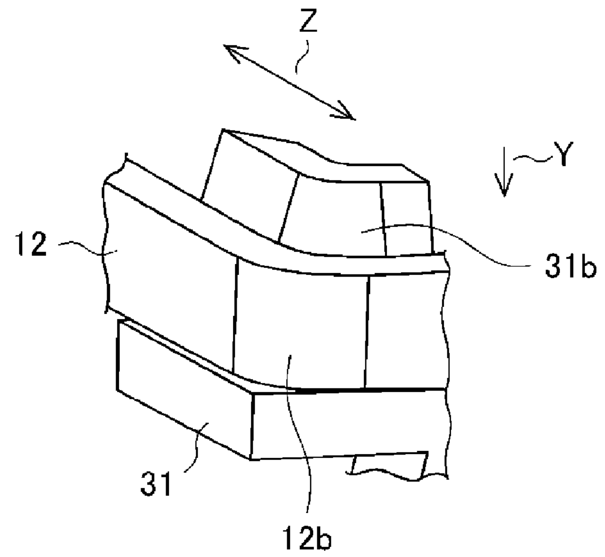
FIG. 6 is a partial perspective view showing the restricting member of the slip ring apparatus according to the first embodiment of the invention.

FIG. 4 is a perspective view showing the restricting member according to the first embodiment, FIG. 5 is a perspective view showing a state in which the long-sized lead and the shot-sized lead are fitted into the restricting member shown in FIG. 4, and FIG. 6 is a partial perspective view showing the restricting member shown in FIG. 5, viewed from another direction. In the figures, the arrow Z indicates the axis line direction, and the arrow Y indicates the direction in which the lead is inserted.

As shown in FIGS. 4 and 5, the restricting member 30 includes the lead support portion 31 that is in contact with the long-sized lead 12, the lead support portion 31 that is in contact with the short-sized lead 13, and an annular portion 32 connecting these two lead support portions 31.

The restricting member 30 is an insert component that is disposed inside a mold when molding the molded body 20 and is integrally molded with the molded body 20. The material of the restricting member 30 is selected from insulating resin materials that show good adhesion with the resin material of the molded body 20. Alternatively, it is possible to use the same insulating resin material as the molded body 20.

Each of the lead support portions 31 of the restricting member 30 is such as to be in contact with at least a radially outward face of each of the bent lead portions 12*b* and 13*b*. However, the area of contact is not limited, and it is also possible to allow the lead support portions 31 to be in contact with the linear lead portions 12*a* and 13*a*. Nevertheless, the interface between the restricting member 30 and the molded body 20 is more susceptible to cracks than the other locations of the molded body 20, so the interface should be disposed at a position that is free from stress at the time of applying a heat cycle.

In addition, each of the lead support portions 31 has a first tapered portion 31*a* being a tip end portion to be inserted into a mold and being tapered toward the insertion direction. Providing the first tapered portion 31*a* allows the restricting member 30 to be inserted into the mold more easily, and thus improves workability.

In addition, as shown in FIG. 6, each of the lead support portions 31 has a second tapered portion 31*b* being in contact with the bent lead portion 12*b* (13*b*) and being tapered toward an opening side. Providing the second tapered portion 31*b* allows the bent lead portion 12*b* (13*b*) to be inserted into the lead support portion 31 more easily, and thus improves workability.

Next, a method of manufacturing the slip ring apparatus 7 according to the first embodiment will be described. First, a tip end portion of the long-sized lead 12 is connected to the first ring 10 by welding, and a tip end portion of the short-sized lead 13 is connected to the second ring 11 by welding. Next, the first ring 10 and the second ring 11 are fitted into the ring support portion 16.

Subsequently, as shown in FIG. 5, the respective bent lead portions 12*b* and 13*b* of the long-sized lead 12 and the short-sized lead 13 are fitted into the lead support portions 31 of the restricting member 30. Thereafter, the restricting member 30, the first ring 10 to which the long-sized lead 12 has been welded, and the second ring 11 to which the short-sized lead 13 has been welded are placed at a predetermined position in a mold.

At this time, the restricting member 30 is disposed in the mold in such a state that the bent lead portions 12*b* and 13*b* are brought into contact with the two lead support portions 31 respectively so as to impart a tension to the linear lead portions 12*a* and 13*a*. Thereafter, a molten resin material is filled into the mold. Thereby, the long-sized lead 12 and the short-sized lead 13 are integrally molded with the molded body 20 at predetermined positions, without being displaced or deformed by the pressure of the resin. After a predetermined molding time has elapsed, the mold is released, and thus, the slip ring apparatus 7 is completed.

This first embodiment has described a manufacturing method in the case that the restricting member 30 is an insert component. However, the restricting member 30 may be integrally molded with the long-sized lead 12 and the short-sized lead 13 by primary molding prior to insert molding.

The slip ring apparatus 7 according the first embodiment is provided with the restricting member 30 being in contact with the bent lead portions 12*b* and 13*b* of the long-sized lead 12 and the short-sized lead 13 and imparting a tension to the linear lead portions 12*a* and 13*a* in the mold for the insert molding. Therefore, the slip ring apparatus 7 can reliably prevent the leads from the displacement and deformation resulting from the pressure of the resin at the time of insert molding.

Thus, the slip ring apparatus 7 allows the long-sized lead 12 and the short-sized lead 13 to be disposed at proper positions in the molded body 20 and prevents the long-sized lead 12 and the short-sized lead 13 from being exposed from the molded body 20. For these reasons, the first embodiment can obtain a highly reliable slip ring apparatus 7 that makes it possible to inhibit the defects due to the displacement or deformation of the leads.

Second Embodiment

In a second embodiment of the invention, a modified example of the restricting member 30, which has been described in the foregoing first embodiment, will be described with reference to FIGS. 7 and 8. The overall configuration of the slip ring apparatus according to this second embodiment is substantially the same as that described in the foregoing first embodiment. Therefore, referring again to FIG. 2, the detailed descriptions thereof are omitted.

Figure 7:
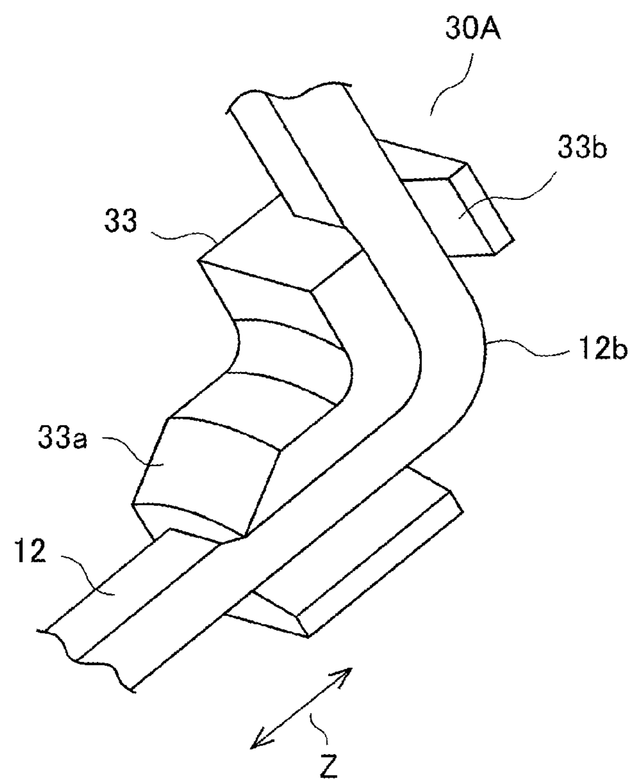
FIG. 7 is a partial perspective view showing a restricting member of a slip ring apparatus according to a second embodiment of the invention.

As shown in FIG. 7, each of lead support portions 33 of a restricting member 30A according to the second embodiment has a recessed portion that surrounds three faces of the bent lead portion 12*b* (13*b*) each facing a different direction, including a radially outward face thereof. This makes it possible to retain the bent lead portion 12*b* (13*b*) more reliably.

Each of the lead support portions 33 has a first tapered portion 33*a* being a tip end portion to be inserted into a mold and being tapered toward the insertion direction. Providing the first tapered portion 33*a* allows the restricting member 30A to be inserted into the mold more easily, and thus improves workability.

In addition, each of the lead support portions 33 has a second tapered portion 33*b* being in contact with the bent lead portion 12*b* (13*b*) and being tapered toward an opening side. Providing the second tapered portion 33*b* allows the bent lead portion 12*b* (13*b*) to be inserted into the lead support portion 33 more easily, and thus improves workability.

Although the foregoing first embodiment shows an example in which the lead support portion 31 being in contact with the long-sized lead 12 and the lead support portion 31 being in contact with the short-sized lead 13 are connected by the annular portion 32 (see FIG. 4), these portions may not be connected to each other. In other words, the two lead support portions 33 may not be connected by the annular portion 32 but may be provided individually. However, connecting the lead support portions 33 by the annular portion 32 allows each of the lead support portions 33 to be retained stably in the mold, and thus improves assemblability.

Figure 8:
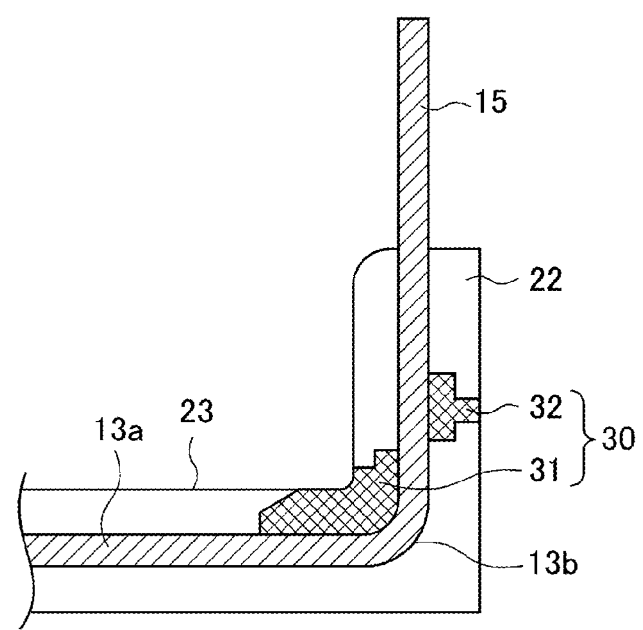
FIG. 8 is an enlarged cross-sectional view showing a primary portion of the slip ring apparatus according to the second embodiment of the invention.

FIG. 8 is an enlarged cross-sectional view showing a primary portion of another modified example of the restricting member 30. In this example, a step is provided at the interface between the restricting member 30 and the molded body 20 so that the interface between the restricting member 30 and the molded body 20 has a cross-sectional shape that is not linear to the long-sized lead 12 and the short-sized lead 13.

Thereby, if cracks are produced in the interface between the restricting member 30 and the molded body 20, a sufficient creepage distance can be ensured, and sparks can be prevented. Moreover, because the shape of the interface becomes more complicated, it is possible to obtain the effect of enhancing the adhesive force between the restricting member 30 and the molded body 20. Note that, as a method of making the shape of the interface more complicated, it is also possible to form a cut-out or surface irregularity, other than providing a step.

In the second embodiment, the restricting member 30 and 30A is an insert component. However, the restricting member 30 and 30A may be integrally molded with the long-sized lead 12 and the short-sized lead 13 by primary molding prior to the insert molding.

The second embodiment can obtain the same advantageous effects as the first embodiment can, and moreover, it can obtain a more highly reliable slip ring apparatus 7 for an electric rotating machine. The invention may be within the scope of the invention, or any combination of the embodiments as appropriate, the modified form of the embodiment will be omitted.

The foregoing embodiments have been described regarding an alternator that can be applied to alternators for the vehicle. However, the invention is not limited thereto, but may also be applied to, for example, alternators for outboard engines. The invention can also be applied to electric motors.

Various modifications and alterations of this invention will be apparent to those skilled in the art without departing from the scope and spirit of this invention, and it should be understood that this is not limited to the illustrative embodiments set forth herein.

What is claimed is:

1. A slip ring apparatus for an electric rotating machine, comprising:

a first ring and a second ring being insulated from each other and disposed coaxially with each other;

a long-sized lead, one end of which being connected only to the first ring amongst the first ring and the second ring and the other end of which being connected as a terminal to a rotor coil;

a short-sized lead, one end of which being connected only to the second ring amongst the first ring and the second ring and the other end of which being connected as a terminal to the rotor coil;

a restricting member configured to determine positions of the long-sized lead and the short-sized lead;

and a molded body retaining the first ring, the second ring, the long-sized lead, the short-sized lead, and the restricting member, wherein:

the long-sized lead and the short-sized lead respectively have linear lead portions disposed axially parallel to each other, and bent lead portions formed by bending the linear lead portions radially outward, and the bent lead portions respectively are between the linear lead portions and the terminals;

the restricting member has lead support portions each being in contact with at least a radially outward face of each of the bent lead portions of the long-sized lead and the short-sized lead; and the long-sized lead is disposed at a predetermined position in the molded body in such a state that a tension is imparted to the linear lead portion by the first ring and the lead support portions, and the short-sized lead is disposed at a predetermined position in the molded body in such a state that a tension is imparted to the linear lead portion by the second ring and the lead support portions.

2. The slip ring apparatus for an electric rotating machine according to claim 1, wherein the restricting member is an insert component integrally molded with the molded body.

3. The slip ring apparatus for an electric rotating machine according to claim 1, wherein a material of the restricting member is selected from insulating resin materials having adhesion with a resin material of the molded body.

4. The slip ring apparatus for an electric rotating machine according to claim 1, wherein the restricting member is made of the same insulating resin material as the molded body.

5. The slip ring apparatus for an electric rotating machine according to claim 1, wherein an interface between the restricting member and the molded body has a cross-sectional shape that is not linear from the molded body surface to the long-sized lead or the short-sized lead.

6. The slip ring apparatus for an electric rotating machine according to claim 1, wherein each of the lead support portions has a recessed portion surrounding three faces of each of the bent lead portions, the three faces including the radially outward face thereof and each facing a different direction.

7. The slip ring apparatus for an electric rotating machine according to claim 1, wherein each of the lead support portions has a first tapered portion being a tip end portion to be inserted into a mold and being tapered toward an insertion direction.

8. The slip ring apparatus for an electric rotating machine according to claim 1, wherein each of the lead support portions has a second tapered portion being in contact with the bent lead portions and being tapered toward an opening side of a respective lead, the opening side of the respective lead not being enclosed by a respective lead support portion.

9. The slip ring apparatus for an electric rotating machine according to claim 1, wherein the restricting member has an annular portion connecting the lead support portion being in contact with the long-sized lead and the lead support portion being in contact with the short-sized lead to each other.

* * * * *